(12) United States Patent  (10) Patent No.: US 9,454,768 B2
Chavarria et al.  (45) Date of Patent: Sep. 27, 2016

(54) METHOD AND SYSTEM FOR ESTIMATING A PRICE OF A TRIP BASED ON TRANSACTION DATA

(71) Applicant: MasterCard International Incorporated, Purchase, NY (US)

(72) Inventors: Pedro Chavarria, Hampton Bays, NY (US); Kristofer Perez, New York, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/554,810

(22) Filed: Nov. 26, 2014

(65) Prior Publication Data

US 2016/0148234 A1  May 26, 2016

(51) Int. Cl.
   *G06K 5/00*  (2006.01)
   *G06Q 30/02*  (2012.01)

(52) U.S. Cl.
   CPC .................................. *G06Q 30/0206* (2013.01)

(58) Field of Classification Search
   USPC ........................ 235/380, 384; 705/5, 6, 14.31
   See application file for complete search history.

(56) References Cited

U.S. PATENT DOCUMENTS

| | | | |
|---|---|---|---|
| 5,025,138 A | 6/1991 | Cuervo | |
| 6,327,574 B1 | 12/2001 | Kramer et al. | |
| 6,801,909 B2 | 10/2004 | Delgado et al. | |
| 6,842,737 B1 | 1/2005 | Stiles et al. | |
| 7,269,568 B2 | 9/2007 | Stiles et al. | |
| 7,792,697 B2 | 9/2010 | Bhagchandani et al. | |
| 7,848,950 B2 | 12/2010 | Herman et al. | |
| 7,925,540 B1 | 4/2011 | Orttung et al. | |
| 7,958,066 B2 | 6/2011 | Pinckney et al. | |
| 7,966,282 B2 | 6/2011 | Pinckney et al. | |
| 8,005,832 B2 | 8/2011 | Andrieu | |
| 8,032,480 B2 | 10/2011 | Pinckney et al. | |
| 8,032,481 B2 | 10/2011 | Pinckney et al. | |
| 8,180,702 B2 | 5/2012 | Debow | |
| 8,185,487 B2 | 5/2012 | Tuzhilin et al. | |
| 8,190,478 B2 | 5/2012 | Herman et al. | |
| 8,204,784 B2 | 6/2012 | Bhagchandani et al. | |
| 8,255,263 B2 | 8/2012 | Smallwood | |
| 8,374,936 B2 | 2/2013 | Fuentes-Torres | |
| 8,458,016 B1 | 6/2013 | Medina, III et al. | |
| 8,484,142 B2 | 7/2013 | Pinckney et al. | |
| 8,489,497 B1 | 7/2013 | Novak et al. | |
| 8,494,978 B2 | 7/2013 | Pinckney et al. | |
| 8,572,020 B2 | 10/2013 | Tuzhilin et al. | |
| 8,583,511 B2 | 11/2013 | Hendrickson | |

(Continued)

*Primary Examiner* — Ahshik Kim
(74) *Attorney, Agent, or Firm* — Armstrong Teadale LLP

(57) ABSTRACT

A computer-implemented method for estimating a price of a candidate trip based on transaction data is provided. The method includes generating a profile associated with a first cardholder, based at least in part on stored first transaction data associated with one or more purchases made by the first cardholder through a payment network. The profile indicates a spending trend of the first cardholder. The method additionally includes determining a price paid by at least a second cardholder for a reference trip, based at least in part on second transaction data stored in one or more memory devices. The second transaction data is associated with purchases made by the second cardholder through the payment network during the reference trip. Additionally, the method includes determining an estimated price for the candidate trip for the first cardholder by adjusting the price paid based at least in part on the spending trend of the first cardholder.

19 Claims, 13 Drawing Sheets

(56) References Cited

U.S. PATENT DOCUMENTS

| | | |
|---|---|---|
| 8,666,909 B2 | 3/2014 | Pinckney et al. |
| 8,694,456 B2 | 4/2014 | Grigg et al. |
| 8,719,085 B2 | 5/2014 | Sullivan |
| 8,751,272 B1 * | 6/2014 | Seybold ............ G06Q 30/0629 705/1.1 |
| 2002/0091535 A1 | 7/2002 | Kendall et al. |
| 2002/0147619 A1 | 10/2002 | Floss et al. |
| 2002/0166060 A1 | 11/2002 | Hsieh et al. |
| 2007/0100773 A1 | 5/2007 | Wallach |
| 2007/0174097 A1 * | 7/2007 | Gillespie ............ G06Q 10/02 705/5 |
| 2008/0167887 A1 | 7/2008 | Marcken |
| 2008/0249987 A1 | 10/2008 | Ogasawara |
| 2009/0198557 A1 | 8/2009 | Wang et al. |
| 2009/0281875 A1 | 11/2009 | Tarka |
| 2009/0319423 A1 | 12/2009 | Kersenbrock |
| 2010/0280880 A1 | 11/2010 | Faith et al. |
| 2011/0077951 A1 | 3/2011 | Tullis |
| 2011/0078021 A1 | 3/2011 | Tullis |
| 2011/0307478 A1 | 12/2011 | Pinckney et al. |
| 2012/0226551 A1 | 9/2012 | Bhagchandani et al. |
| 2012/0245991 A1 | 9/2012 | Herman et al. |
| 2012/0303569 A1 | 11/2012 | Tuzhilin et al. |
| 2012/0303676 A1 | 11/2012 | Tuzhilin et al. |
| 2012/0324059 A1 | 12/2012 | Tuzhilin et al. |
| 2013/0030925 A1 | 1/2013 | Calman et al. |
| 2013/0046626 A1 | 2/2013 | Grigg et al. |
| 2013/0075469 A1 | 3/2013 | Stochita |
| 2013/0124449 A1 | 5/2013 | Pinckney et al. |
| 2013/0179246 A1 | 7/2013 | Ross |
| 2013/0246125 A1 | 9/2013 | Digioacchino et al. |
| 2013/0264385 A1 | 10/2013 | Stoudt et al. |
| 2013/0275181 A1 | 10/2013 | Digioacchino et al. |
| 2013/0275417 A1 | 10/2013 | Fernandes |
| 2013/0304691 A1 | 11/2013 | Pinckney et al. |
| 2014/0006067 A1 * | 1/2014 | Rothley ............ G06Q 10/02 705/5 |
| 2014/0108320 A1 | 4/2014 | Baca et al. |
| 2014/0129372 A1 | 5/2014 | Kalnsay |
| 2014/0180979 A1 | 6/2014 | Pinckney et al. |
| 2015/0134373 A1 * | 5/2015 | Le Marier ............ G06Q 50/14 705/5 |

* cited by examiner

METHOD AND SYSTEM FOR ESTIMATING A PRICE OF A TRIP BASED ON TRANSACTION DATA

BACKGROUND

This description relates to estimating a price of a planned trip (a "candidate trip"), and more specifically to estimating a price of a candidate trip based on processed payment transactions.

Known systems for estimating a price for a candidate trip receive information specifying products and/or services ("goods") that a person has indicated he or she will be purchasing, in order to provide an estimated price for the trip. For example, such systems combine the prices of specific flights to and from the destination, the price of a hotel or other accommodations at the destination, the price of a rental car at the destination, and, in some instances, the price of attendance at a specific event, to arrive at an estimated price for the trip. Such systems do not take into account the spending trend of the person planning to take the trip, such as a spending trend regarding meals and/or entertainment that the person is likely to purchase during the trip. Accordingly, known systems may not provide a complete estimate of the price of the trip for the person planning the trip.

BRIEF DESCRIPTION OF THE DISCLOSURE

In one aspect, a computer-implemented method for estimating a price of a candidate trip based on transaction data is provided. The method is implemented using an estimating computing device in communication with one or more memory devices. The method includes generating a profile associated with a first cardholder, based at least in part on first transaction data stored in the one or more memory devices. The first transaction data is associated with one or more purchases made by the first cardholder through a payment network. The profile indicates a spending trend of the first cardholder. The method additionally includes determining a price paid by at least a second cardholder for a reference trip, based at least in part on second transaction data stored in the one or more memory devices. The second transaction data is associated with purchases made by the second cardholder through the payment network during the reference trip. Additionally, the method includes determining an estimated price for the candidate trip for the first cardholder by adjusting the price paid based at least in part on the spending trend of the first cardholder.

In another aspect, an estimating computing device for estimating a price of a candidate trip based on transaction data is provided. The estimating computing device includes one or more processors in communication with one or more memory devices. The estimating computing device is configured to generate a profile associated with a first cardholder, based at least in part on first transaction data stored in the one or more memory devices. The first transaction data is associated with one or more purchases made by the first cardholder through a payment network. The profile indicates a spending trend of the first cardholder. The estimating computing device is further configured to determine a price paid by at least a second cardholder for a reference trip, based at least in part on second transaction data stored in the one or more memory devices. The second transaction data is associated with purchases made by the second cardholder through the payment network during the reference trip. The estimating computing device is further configured to determine an estimated price for the candidate trip for the first cardholder by adjusting the price paid based at least in part on the spending trend of the first cardholder.

In yet another aspect, a computer-readable storage medium having computer-executable instructions embodied thereon for estimating a price of a candidate trip based on transaction data is provided. When executed by an estimating computing device having one or more processors in communication with one or more memory devices, the computer-executable instructions cause the estimating computing device to generate a profile associated with a first cardholder, based at least in part on first transaction data stored in the one or more memory devices. The first transaction data is associated with one or more purchases made by the first cardholder through a payment network. The profile indicates a spending trend of the first cardholder. Additionally, the computer-executable instructions cause the estimating computing device to determine a price paid by at least a second cardholder for a reference trip, based at least in part on second transaction data stored in the one or more memory devices. The second transaction data is associated with purchases made by the second cardholder through the payment network during the reference trip. Additionally, the computer-executable instructions cause the estimating computing device to determine an estimated price for the candidate trip for the first cardholder by adjusting the price paid based at least in part on the spending trend of the first cardholder.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example payment processing system, a travel estimator computing device, and an estimating system in communication with other computing devices in accordance with one example embodiment of the present disclosure.

FIG. 3 is an expanded block diagram of an example embodiment of a server architecture of the payment processing system including the travel estimator computing device and a plurality of other computing devices in accordance with one example embodiment of the present disclosure.

FIG. 4 illustrates an example configuration of a client system shown in FIGS. 2 and 3 in accordance with one example embodiment of the present disclosure.

FIG. 5 illustrates an example configuration of a server system shown in FIGS. 2 and 3 in accordance with one example embodiment of the present disclosure.

FIG. 6 is a block diagram of an example relationship between cardholders, merchants, categories of spending trends that the cardholders fall into based on purchases from the merchants, and transactions analyzed by an estimating system.

FIG. 7 is a block diagram of an example relationship between categories of spending trends of cardholders and interests that is analyzed by the estimating system in accordance with one example embodiment of the present disclosure.

FIG. 8 is a block diagram of an example data flow from purchases made by a cardholder to a profile of the cardholder that is analyzed by the estimating system in accordance with one example embodiment of the present disclosure.

FIG. 9 is a block diagram of an example reference trip that was taken by a cardholder that is analyzed by the estimating system in accordance with one example embodiment of the present disclosure.

FIG. 10 is a block diagram of data analyzed by a server system included in the payment processing system of FIG. 2 to estimate a price of a candidate trip for a cardholder in accordance with one example embodiment of the present disclosure.

FIG. 11 is a block diagram of example communications among a cardholder, a server system, and the travel estimator computing device shown in FIG. 2 in accordance with one example embodiment of the present disclosure.

FIG. 12 is a flowchart of an example process that may be performed by the estimating system for estimating a price of a planned trip based on transaction data in accordance with one example embodiment of the present disclosure.

FIG. 13 is a diagram of components of one or more example computing devices that may be used in embodiments of the described systems and methods.

DETAILED DESCRIPTION OF THE DISCLOSURE

Figure 1:
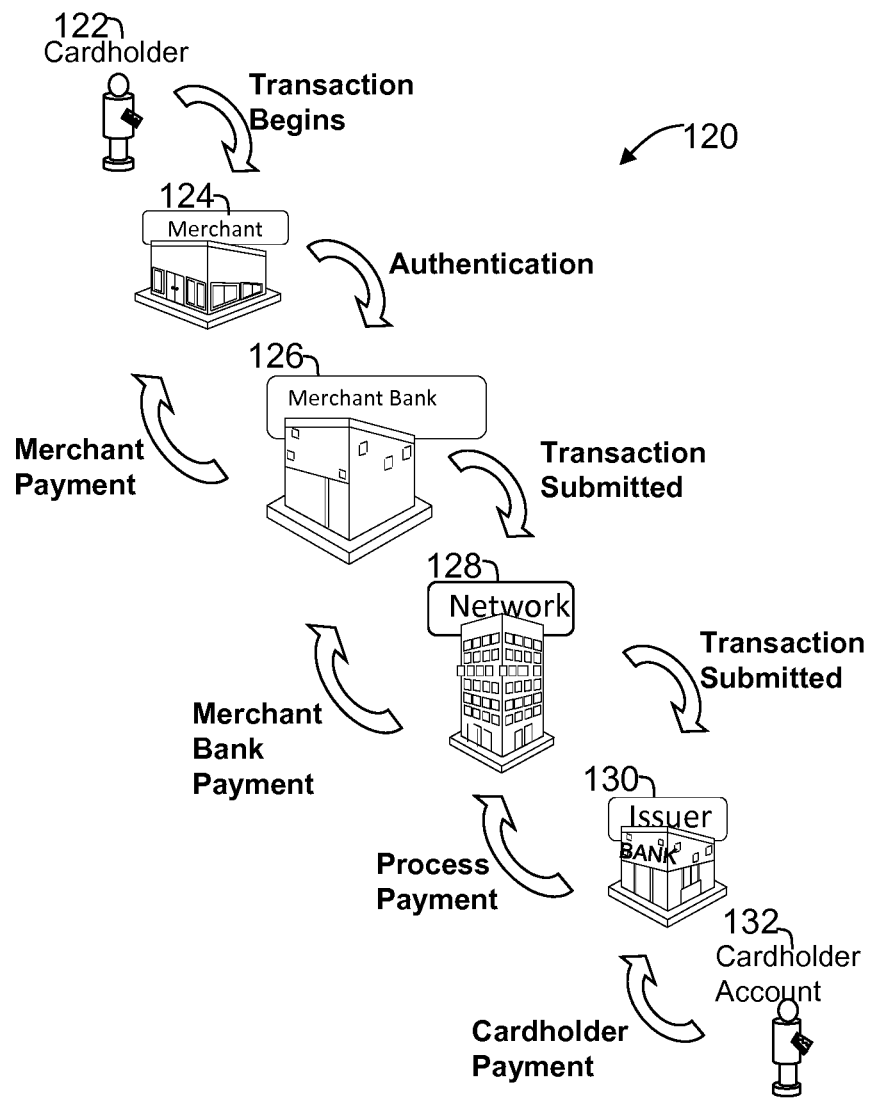
FIGS. 1-13 show example embodiments of the methods and systems described herein.

Implementations of the method and system ("estimating system") described herein estimate a price for a planned trip (a "candidate trip") that involves travel, such as a vacation or a business trip, based on stored transaction data associated with cardholders. That is, a first cardholder accesses the estimating system, for example through a web browser, and enters parameters for a candidate trip. For example, the first cardholder specifies that he plans to travel to Las Vegas from June 23-30. The first cardholder then requests that the estimating system inform him of the estimated amount of money that the candidate trip will cost. In order to provide the estimate, the estimating system uses a database that includes historical transaction data, as follows.

Prior to the first cardholder accessing the estimating system to request an estimate for the candidate trip to Las Vegas, the estimating system stores, in a database, historical payment transactions processed for multiple cardholders, including the first cardholder, through a payment network. Additionally, the estimating system generates a profile that is representative of a spending trend of the first cardholder, based on the historical payment transactions associated with the first cardholder (i.e., purchases made by the first cardholder using a payment card and processed through the payment network). For example, the estimating system may determine that the first cardholder purchases drinks at bars relatively frequently and that the bars that the first cardholder purchases from are relatively expensive. Additionally, in generating the profile, the estimating system may determine a life stage of the first cardholder.

Additionally, while building the database of historical payment transaction data, the estimating system identifies a historical price paid by at least a second cardholder for a trip (a "reference trip") similar to the candidate trip that the first cardholder plans to take. For example, the estimating system may determine that the second cardholder visited Las Vegas a year ago, during the summer, for one week and, by totaling all transaction amounts from purchases made by the second cardholder in association with the reference trip, the system determines the price paid by the second cardholder for the reference trip. Additionally, the system adjusts the historical price paid based at least in part on the spending trend of the first cardholder. For example, while the second cardholder paid a particular price for the reference trip and also visited bars, as the first cardholder is likely to do, the estimating system may determine that the first cardholder would spend 25% more because the first cardholder tends to visit more expensive bars than the second cardholder.

In some implementations, the estimating system factors in the life stages of the first cardholder and the second cardholder in determining the estimated price. More specifically, the first cardholder may be more likely to purchase from different types of merchants than the second cardholder because the first cardholder is, for example, single and relatively young while the second cardholder is a married and middle-aged, with children. The system may also base the determination of the estimated price on additional factors such as a purpose of the candidate trip (e.g., bachelor party or professional conference), and/or an amount of inflation between the time when the second cardholder took the reference trip and when the first cardholder is planning to take the candidate trip. In some implementations, rather than basing the estimate on just the reference trip taken by the second cardholder, the system may identify multiple reference trips similar to the candidate trip planned by the first cardholder and combine the prices paid by each cardholder, for example by averaging them into a single historical price paid for such a trip. Additionally, the system may receive an indication from the cardholder that the cardholder agrees to generation of the profile based on the stored transaction data. In other words, such implementations of the system enable the cardholder to affirmatively opt-in to generation of the profile.

The methods and systems described herein may be implemented using computer programming or engineering techniques including computer software, firmware, hardware or any combination or subset thereof, to perform at least one of: (a) generating a profile associated with a first cardholder, based at least in part on first transaction data stored in one or more memory devices, wherein the first transaction data is associated with one or more purchases made by the first cardholder through a payment network and wherein the profile indicates a spending trend of the first cardholder; (b) determining a price paid by at least a second cardholder for a reference trip, based at least in part on second transaction data stored in the one or more memory devices, wherein the second transaction data is associated with purchases made by the second cardholder through the payment network during the reference trip; and (c) determining an estimated price for a candidate trip for the first cardholder by adjusting the price paid based at least in part on the spending trend of first cardholder. By performing the steps included herein, the resulting technical effect includes at least generating a more accurate estimate of a price of a candidate trip by basing the estimate on a spending profile of the traveler and on actual spend amounts from other similar trips from other travelers.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the estimating system is executed on a single computer system, without requiring a connection to a server computer. In a further example embodiment, the estimating system is being run in a Windows® environment (Windows is a registered trademark of Microsoft Corporation, Redmond, Wash.). In yet another embodiment, the estimating system is run on a mainframe environment and a UNIX® server environment (UNIX is a registered trademark of AT&T located in New York, N.Y.). The application is flexible and designed to run in various different environments without compromising any major functionality. In some embodiments, the estimating system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling ordinary payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment card for an account, such as a credit card account or a debit card account, to a cardholder 122, who uses the payment card to tender payment for a purchase from a merchant 124. To accept payment with the payment card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment card (also known as a financial transaction card), merchant 124 requests authorization from acquirer 126 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of products/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group.

Figure 2:
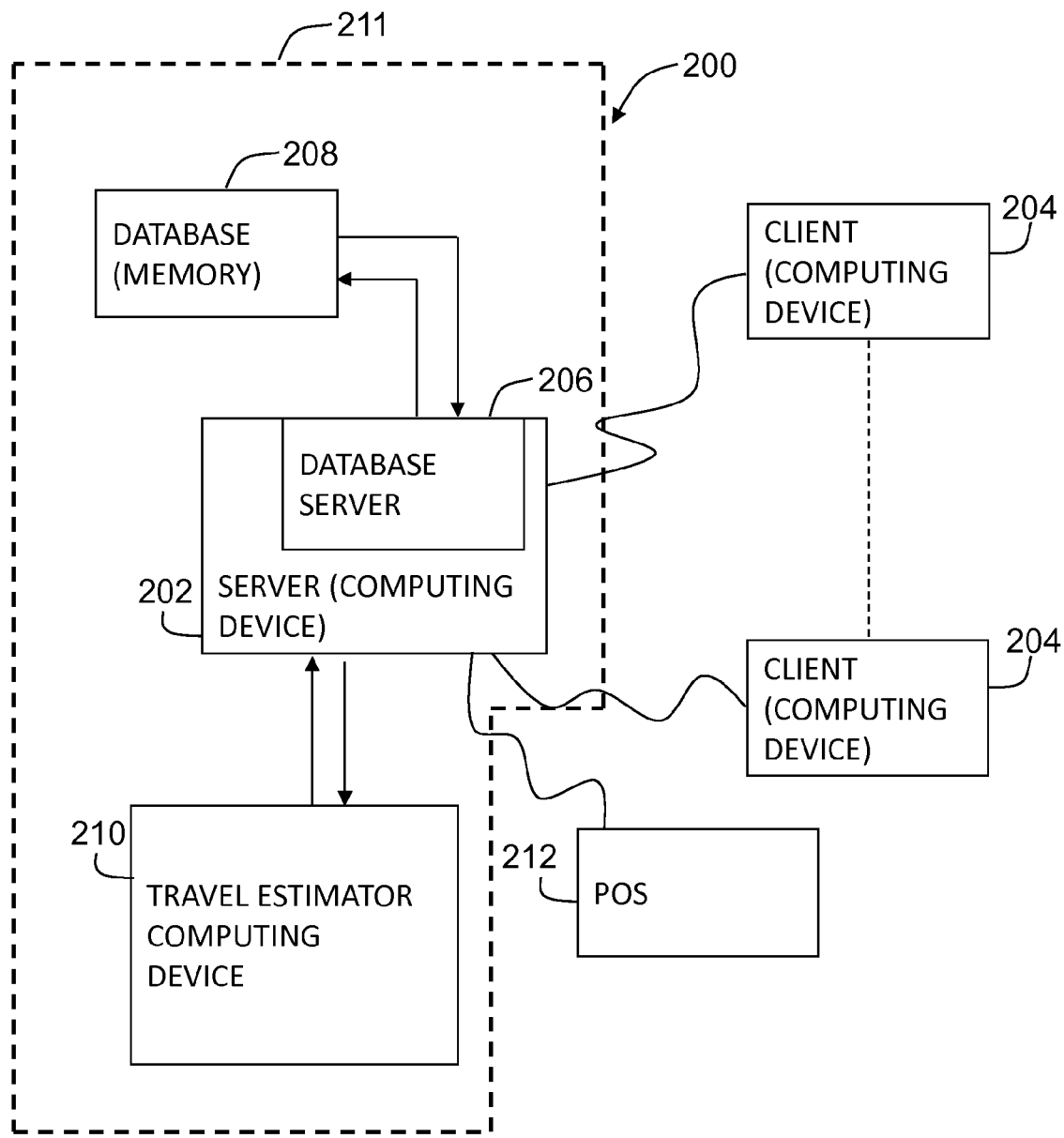

FIG. 2 is a simplified block diagram of a payment processing system 200 that includes a travel estimator computing device 210 and other computing devices in accordance with one embodiment of the present disclosure. In the example embodiment, system 200 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. System 200 includes at least one point-of-sale device 212 in communication with server system 202. Additionally, travel estimator computing device 210 is in communication with server system 202. In some implementations, travel estimator computing device 210 is incorporated into or integrated within server system 202. Together, server system 202, database server 206, database 208, and travel estimator computing device 210 are included in an estimating system ("estimating computing device") 211.

As discussed below, payment processing system 200 processes payments from transactions between cardholders and merchants. For example, one or more such transactions may be initiated at point-of-sale device 212. In processing such payments, server system 202 accesses and populates card transaction data ("transaction data"), stored in database 208. The transaction data includes, for example, merchant identifiers, merchant locations, transaction amounts, product identifiers (e.g., stock keeping units (SKUs)), cardholder identifiers, and transaction dates. Server system 202 analyzes such transaction data and generates a profile associated with at least one cardholder, such as cardholder 122. The profile includes a categorization of a spending trend of the cardholder 122, and in some implementations, an indication of the life stage of cardholder 122. Additionally, server system 202 determines an estimated price for a candidate trip to be taken by cardholder 122, based on factors including the profile of cardholder 122, the destination for the trip, the purpose of the trip, the timing of the trip, and prices that other cardholders have paid for similar trips in the past. As used herein, references to other cardholders taking reference trips should be understood to mean that the cardholders each took one or more respective trips to the same or similar destination, while the purpose and/or timing of such reference trips may vary from one another and from the candidate trip planned by cardholder 122. As described herein, server system 202 accounts for such differences with an adjustment factor. In at least some implementations, server system 202 transmits the estimated price to travel estimator computing device 210, which transmits the estimated price to cardholder 122. In other implementations, travel estimator computing device 210 is included within server system 202. In such implementations, server system 202 transmits the estimated price to cardholder 122. As described above, server system 202, database server 206, database 208, and travel estimator computing device 210 are included in estimating system ("estimating computing device") 211.

Figure 3:
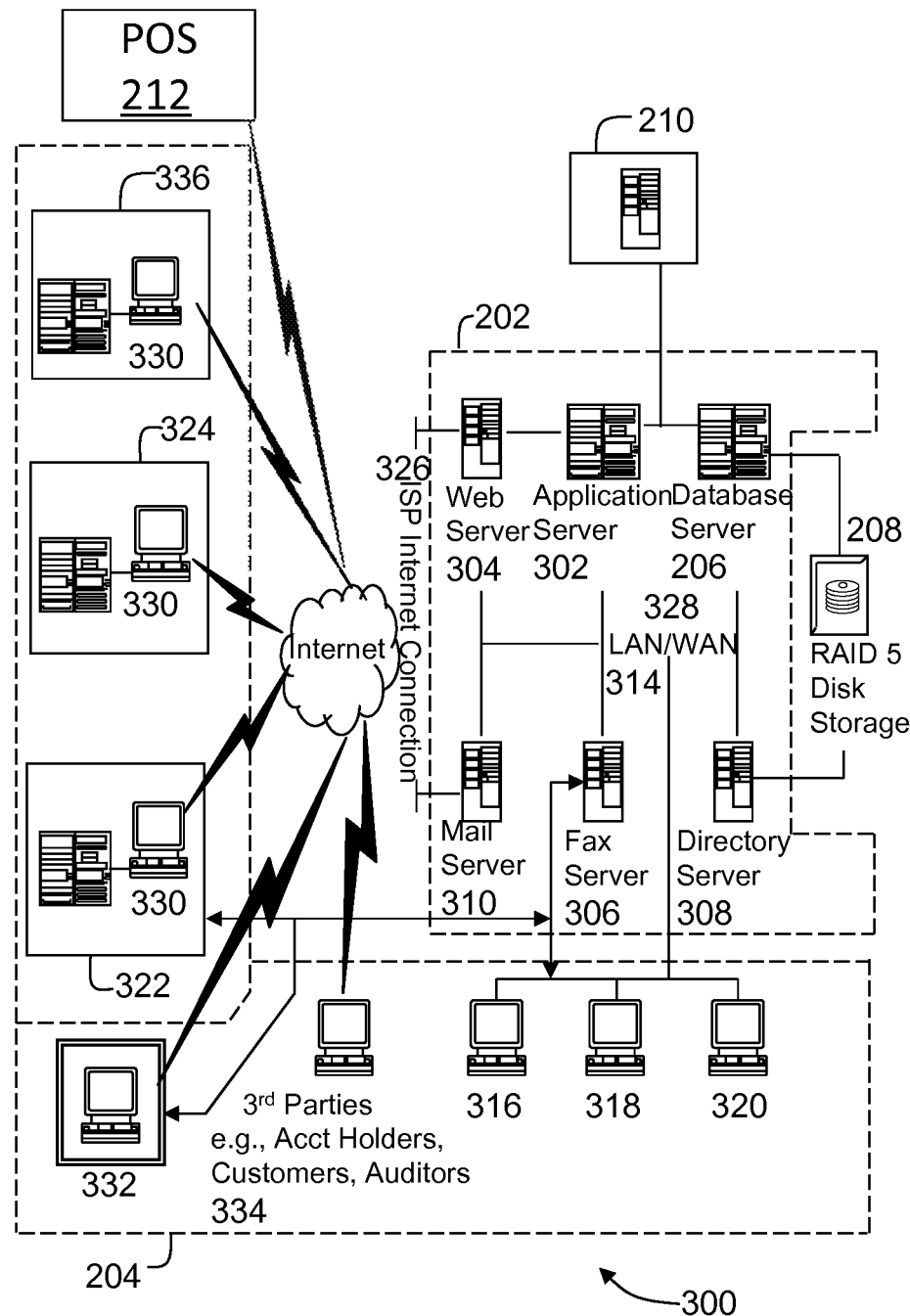

FIG. 3 is an expanded block diagram of an example embodiment of a server architecture of payment processing system 200 in accordance with one embodiment of the present disclosure. Payment processing system 200 includes server system 202, client systems 204, travel estimator computing device 210, and point-of-sale device 212. Server system 202 includes database server 206, an application server 302, a web server 304, a fax server 306, a directory server 308, and a mail server 310. Database 208 (e.g., a disk storage unit), is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including acquirers 322 and issuers 324, and to third parties, e.g., auditors, 334 using an Internet connection 326. Server system 202 is also communicatively coupled with at least one merchant 336. Server system 202 is also communicatively coupled to at least one point-of-sale device 212 and to travel estimator computing device 210. In some embodiments, travel estimator computing device 210 is integrated within server system 202. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

Figure 4:
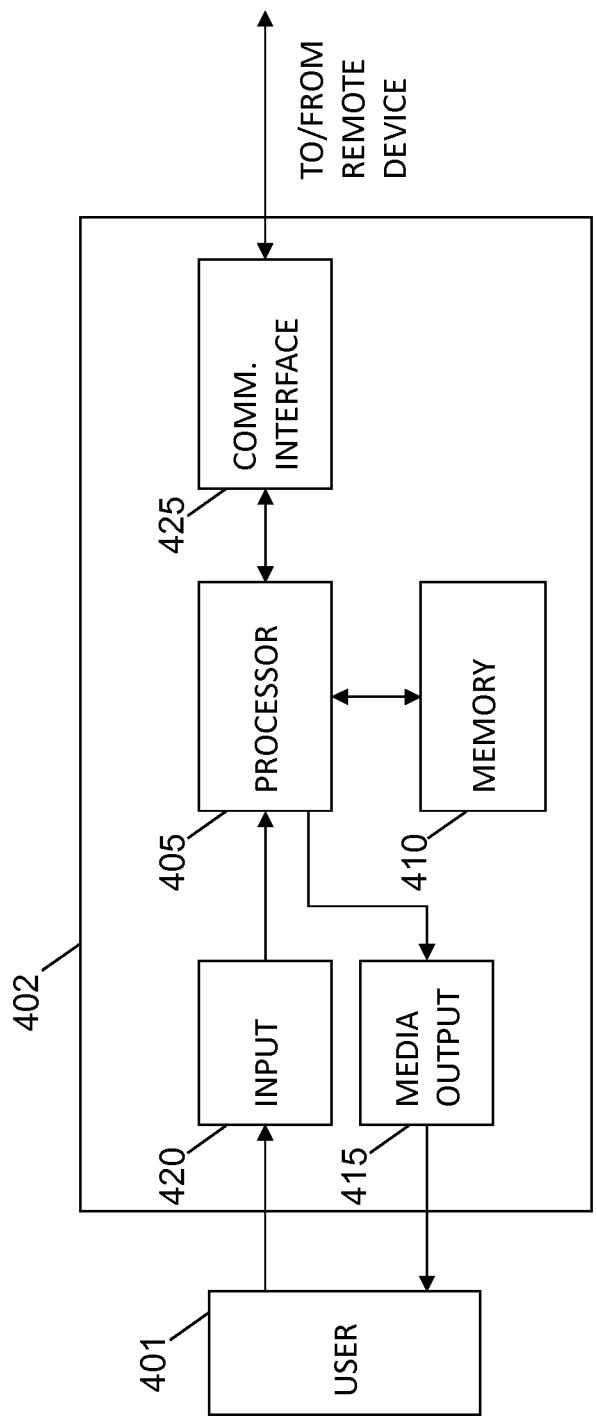

FIG. 4 illustrates an example configuration of a cardholder computing device 402 operated by a user 401. User 401 may include cardholder 122 (FIG. 1). Cardholder computing device 402 may include, but is not limited to, client systems ("client computing devices") 204, 316, 318, and 320, workstation 330, and manager workstation 332 (shown in FIG. 3). The configuration of cardholder computing device 402 is also representative of point-of-sale device 212.

Cardholder computing device 402 includes one or more processors 405 for executing instructions. In some embodiments, executable instructions are stored in a memory area 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Cardholder computing device 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from server system 202 or a web server associated with a merchant. A client application allows user 401 to interact with a server application from server system 202 or a web server associated with a merchant.

Figure 5:
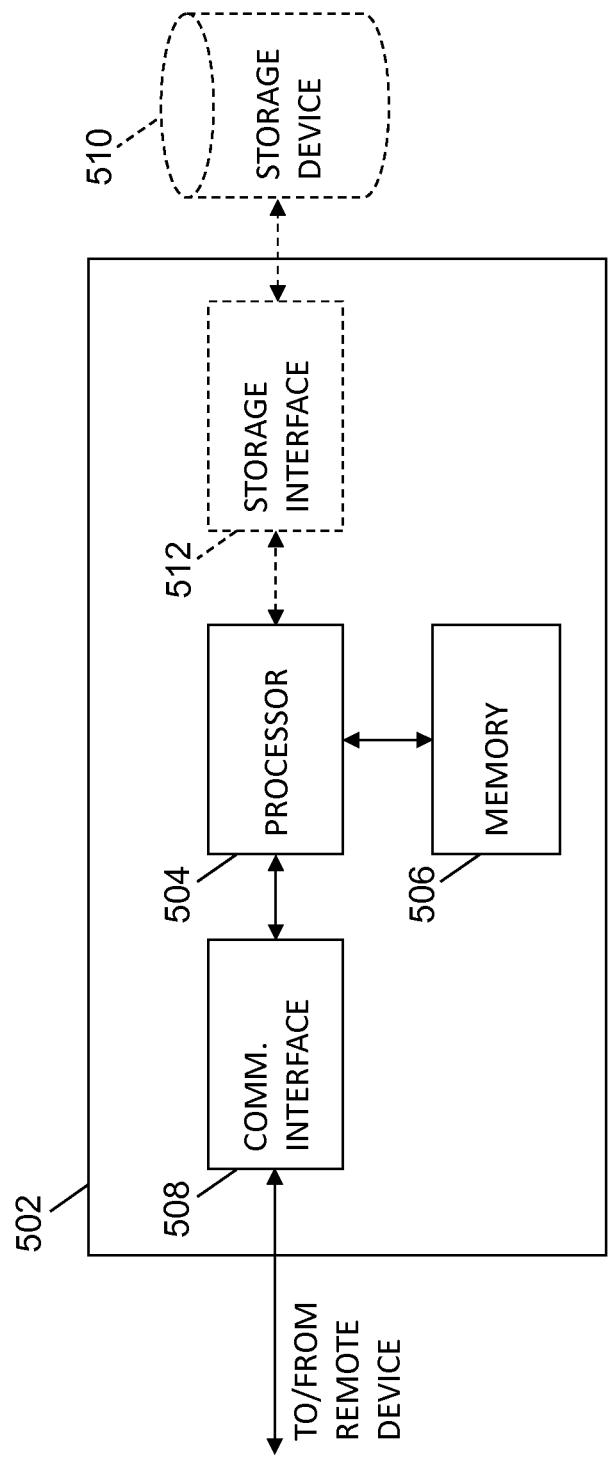

FIG. 5 illustrates an example configuration of a server computing device 502 such as server system 202 (shown in FIGS. 2 and 3). Server computing device 502 may include, but is not limited to, database server 206, application server 302, web server 304, fax server 306, directory server 308, and mail server 310. Server computing device 502 is also representative of travel estimator computing device 210 and of estimating system ("estimating computing device") 211.

Server computing device 502 includes one or more processors 504 for executing instructions. Instructions may be stored in one or more memory devices 506, for example. One or more processors 504 may include one or more processing units (e.g., in a multi-core configuration).

One or more processors 504 are operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

One or more processors 504 may also be operatively coupled to one or more storage devices 510. One or more storage devices 510 are any computer-operated hardware suitable for storing and/or retrieving data. In some embodiments, one or more storage devices 510 are integrated in server computing device 502. For example, server computing device 502 may include one or more hard disk drives as one or more storage devices 510. In other embodiments, one or more storage devices 510 are external to server computing device 502 and may be accessed by a plurality of server computing devices 502. For example, one or more storage devices 510 may include multiple storage units such as hard disks or solid state disks in a redundant array of inexpensive disks (RAID) configuration. One or more storage devices 510 may include a storage area network (SAN) and/or a network attached storage (NAS) system. In some embodiments, one or more storage devices 510 may include database 208.

In some embodiments, one or more processors 504 are operatively coupled to one or more storage devices 510 via a storage interface 512. Storage interface 512 is any component capable of providing one or more processors 504 with access to one or more storage devices 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 504 with access to one or more storage devices 510.

One or more memory devices 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
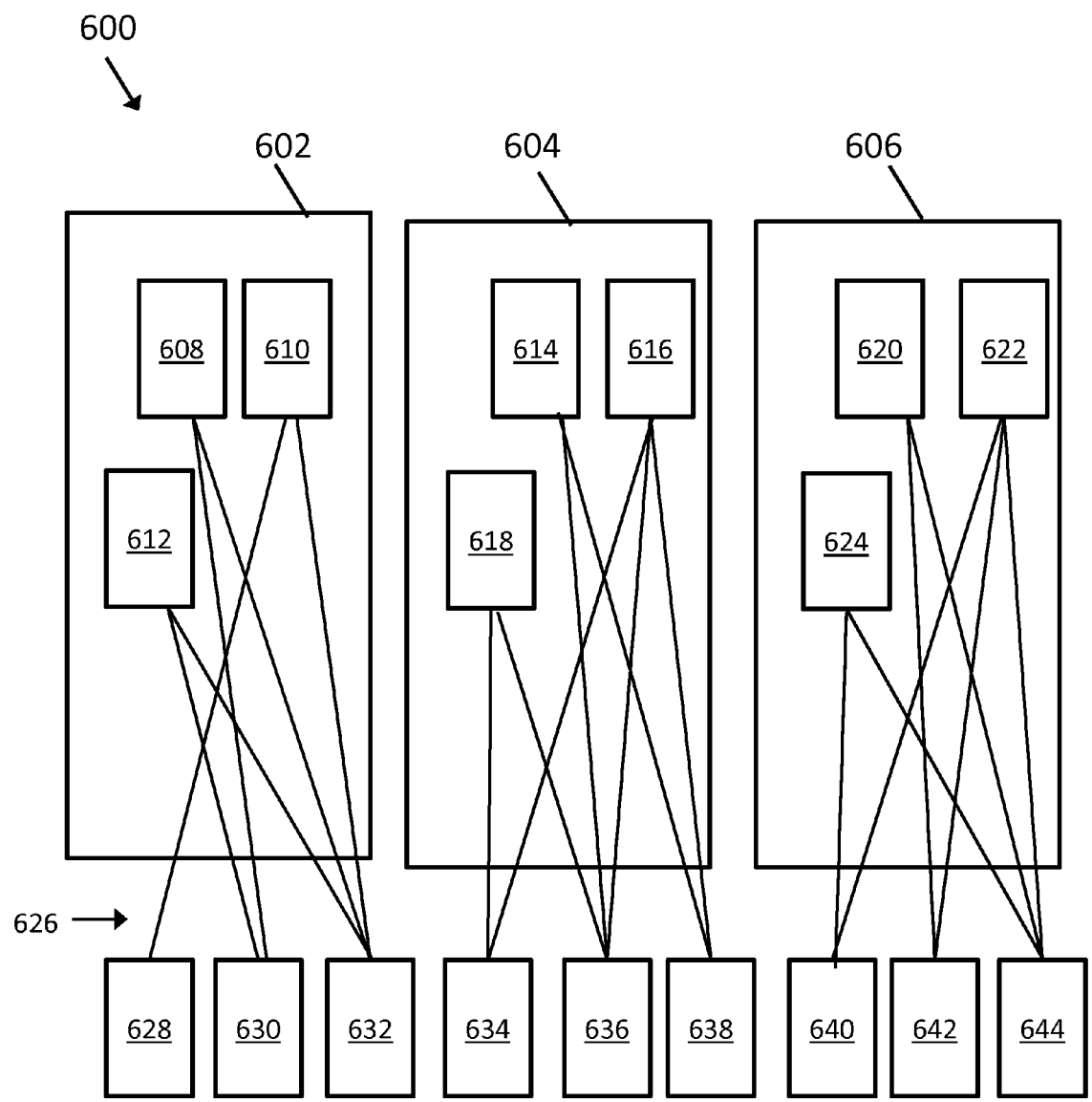

FIG. 6 is a block diagram of an example relationship 600 between cardholders 608, 610, 612, 614, 616, 618, 620, 622, and 624, merchants 628, 630, 632, 634, 636, 638, 640, 642, and 644, and categories of spending trends 602, 604, 606 that the cardholders fall into based on purchases 626 from the merchants. More specifically, database 208 (FIG. 2) includes stored transaction data representing transactions (i.e., purchases of products and/or services, collectively "goods") made by cardholders with merchants. For example, the stored transaction data indicates that first cardholder 608 made one or more purchases from second merchant 630 and third merchant 632. The stored transaction data also indicates that second cardholder 610 made one or more purchases from first merchant 628 and third merchant 632. Additionally, third cardholder 612 made one or more purchases from second merchant 630 and third merchant 632. Server system 202 associates first cardholder 608, second cardholder 610, and third cardholder 612 with a first category 602, based at least in part on the fact that cardholders 608, 610, and 612 purchased from a common set of merchants (e.g., first merchant 628, second merchant 630, and third merchant 632). Additionally, server system 202 may base the categorization on specific products or services ("goods") purchased from the merchants, a price paid, or average price paid ("average transaction amount") associated with the purchases, and/or a frequency of purchases associated with each of the cardholders 608, 610, and 612 during a predefined time period, such as one month.

As an example, cardholders 608, 610, and 612 are all in first category 602, which is associated with a first life stage 701 (FIG. 7) of being a single college graduate between the ages of 21 and 25. Accordingly, cardholders 608, 610, and 612 tend to visit sports bars, such as first merchant 628, music clubs, such as second merchant 630, and coffee shops, such as third merchant 632. As another example, cardholders 614, 616, and 618 are all in second category 604, which is associated with a second life stage 703 (FIG. 7) of being married with at least one child. Cardholders 614, 616, and 618 tend to visit movie theaters such as fourth merchant 634, family restaurants, such as fifth merchant 636, and sports venues, such as sixth merchant 638. As yet another example, cardholders 620, 622, and 624 are in third category 606 which is associated with a third life stage 705 (FIG. 7) of being middle-aged and nearing retirement. Cardholders 620, 622, and 624 tend to visit golf courses, such as seventh merchant 640, eat at relatively high-end restaurants, such as eighth merchant 642, and attend theatrical productions, such as at ninth merchant 644. In some implementations, server system 202 determines the categories 602, 604, and 606 based on comparing the purchases 626 of cardholders 608, 610, 612, 614, 616, 618, 620, 622, and 624 to predefined sets of reference goods associated with respective spending trend and life stages defined in database 208. In other implementations, server system 202 determines the categories 602, 604, and 606 by identifying similarities in the purchases 626 of cardholders 608, 610, 612, 614, 616, 618, 620, 622, and 624.

Figure 7:
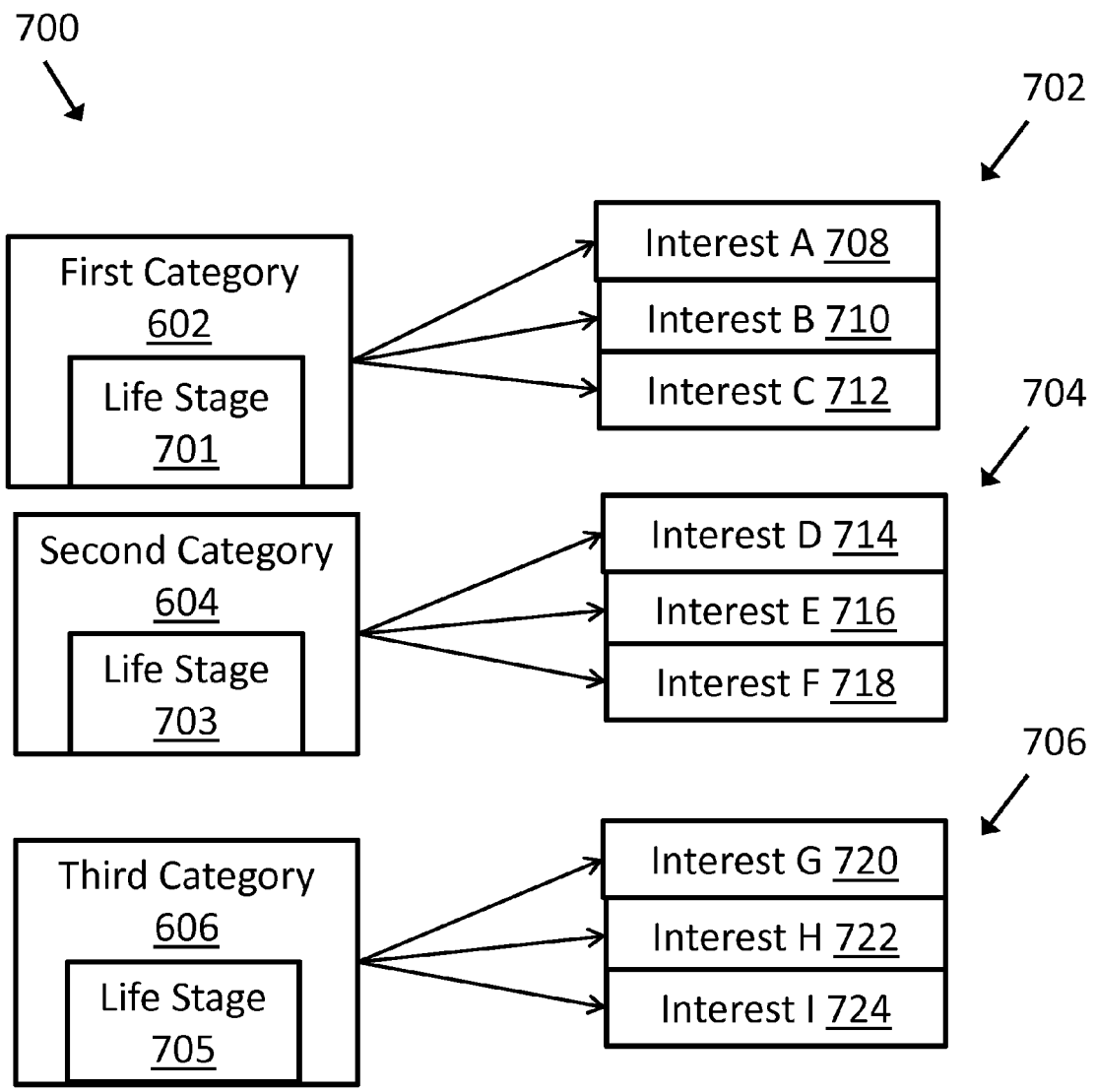

FIG. 7 is a block diagram of an example relationship 700 between categories 602, 604, and 606 of spending trends and interests 708, 710, 712, 714, 716, 718, 720, 722, and 724 associated with the categories 602, 604, and 606. More specifically, first category 602 is associated with a first life stage 701, described above. Accordingly, first category 602 is associated with interest A 708, which is drinking at sports bars, interest B 710, which is music clubs, and interest C 712, which is visiting coffee shops. Second category 604 is associated with a second life stage 703, as described above. Accordingly, second life stage 703 is associated with interest D 714, which is seeing movies at movie theaters, interest E 716, which is eating at family restaurants, and interest F 718, which is going to sporting events. Third category 606 is associated with a third life stage 705, as described above. Accordingly, third category 606 is associated with interest G 720, which is golf, interest H 722 which is fine dining, and interest I 724, which is attending theatrical productions. In other words, each interest represents a set of goods sold by merchants, such as merchants 628, 630, 632, 634, 636, 638, 640, 642, 644 and/or other merchants.

Figure 8:
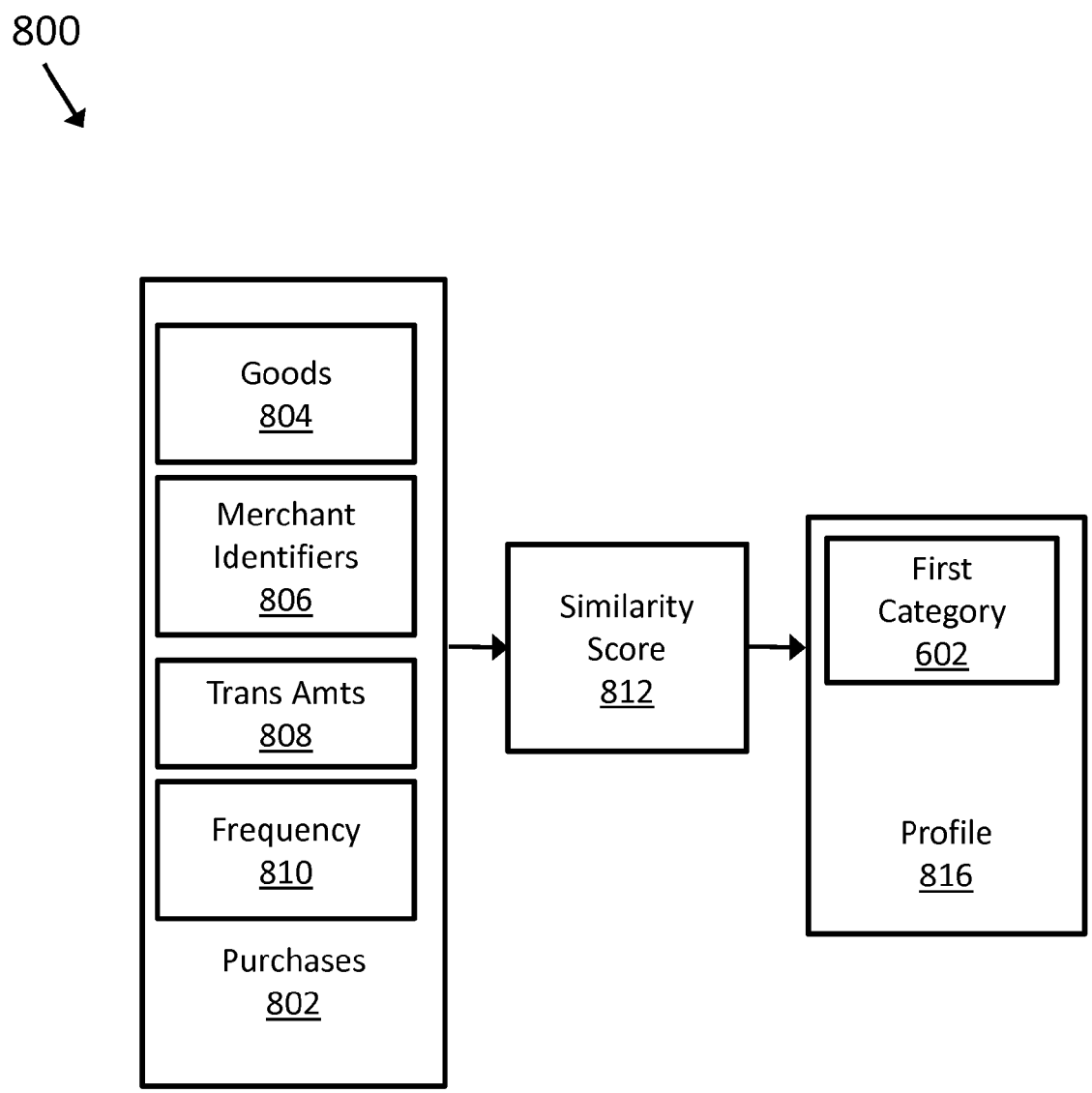

FIG. 8 is a block diagram of an example data flow 800 from purchases 802 made by a cardholder, such as cardholder 122, to a profile 814 of the cardholder. Purchases 802 are included in the stored transaction data in database 208. Included within the information associated with purchases 802 are identifications of goods 804, merchant identifiers 806, transaction amounts 808, and/or frequencies 810 of purchases. Server system 202 compares such information associated with purchases 802 of cardholder 122 with one or more other cardholders (e.g., cardholders 608, 610, 612, 614, 616, 618, 620, 622, and/or 624) and determines a similarity score 812 based on purchases of such cardholders. For example, in some implementations, server system 202 determines a similarity score for each comparison of purchases 802 of cardholder 122 to purchases 626 of each cardholder 608, 610, 612, 614, 616, 618, 620, 622, and/or 624. The similarity score may be, for example, a percentage or other numeric value. In the example, server system 202 determines that greater similarity scores are generated when comparing purchases of cardholder 122 to purchases 626 made by cardholders in first category 602. Accordingly, in such an example, server system 202 designates first category 602 in profile 814.

Figure 9:
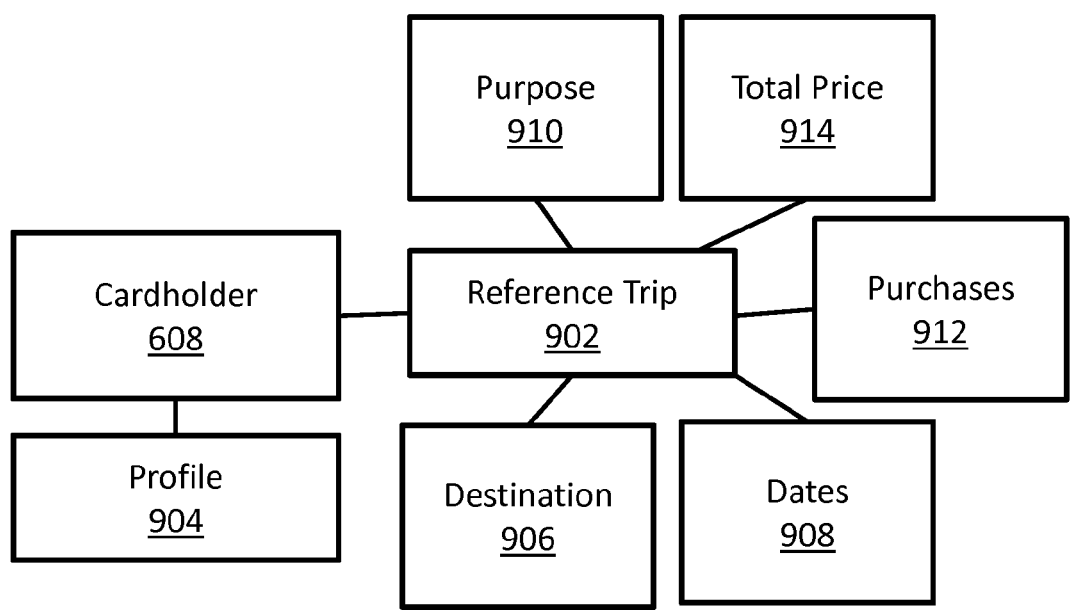

FIG. 9 is a block diagram 900 of a reference trip 902 that was taken by cardholder 608. Server system 202 uses trip 902 as a reference in determining an estimated price for a candidate trip for cardholder 122, as described herein. Cardholder 608 has an associated profile 904, similar to profile 814 (FIG. 8). Cardholder 608 went on reference trip 902 to a destination 906 during a set of dates 908. In this example, cardholder 608 visited Las Vegas from June 21 through June 28 in 2013. Reference trip 902 had an associated purpose 910, which was to be a vacation for cardholder 608. In some implementations, server system 202 determines the purpose of a reference trip (e.g., reference trip 902) based on the types of merchants and/or goods purchased during the trip. In other implementations, server system 202 receives a description of the purpose of the reference trip from the cardholder (e.g., cardholder 608). During reference trip 902, cardholder 608 made a plurality of purchases 912 consistent with the profile 904 (i.e., category of spending trend, stage of life, and associated interests) of cardholder 608. Server system 202 sums the purchase amounts associated with purchases 912 to obtain a total price 914 for the reference trip 902. In some implementations, the total price 914 additionally includes the price of traveling to and from destination 906, for example fuel costs or airline ticket costs, and/or the price of accommodations at the destination 906.

Figure 10:
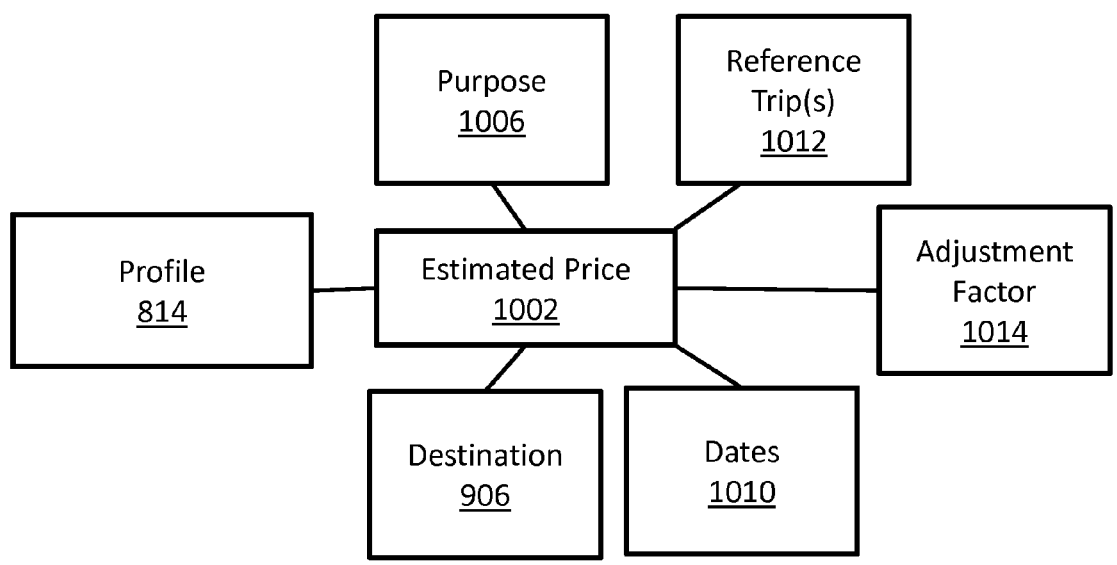

FIG. 10 is a block diagram 1000 of data analyzed by server system 202 to estimate a price of a candidate trip for cardholder 122. More specifically, in generating estimated price 1002, server system 202 takes into account profile 814, the purpose 1006 of the candidate trip, the destination 906, dates 1010 for the candidate trip, one or more reference trips 1012, including reference trip 902 taken by cardholder 608, and an adjustment factor 1014, which server system 1002 generates and applies to account for differences between one or more of profile 814, purpose 1006, and dates 1010 and corresponding profiles, purposes, and dates of the one or more reference trips 1012. More specifically, in at least some implementations, adjustment factor 1014 is a numeric value applied (e.g., multiplied) with estimated price 1002 to increase or decrease estimated price 1002. For example, server system 202 may increase adjustment factor 1014 based on a rate of inflation that occurred between dates 908 and dates 1010. Server system 202 may further increase adjustment factor 1014 if dates 1010 span a longer length of time than dates 908. Further, server system 202 may selectively increase or decrease adjustment factor 1014 based on whether dates 1010 fall within a time of year in which prices at destination 906 tend to be higher or lower than the time of year associated with dates 908. Additionally, server system 202 may selectively increase or decrease adjustment factor 1014 if cardholder 122 falls within a different spending trend category 602, 604, or 606, as indicated in profile 814, as compared to cardholders associated with reference trips 1012 (e.g., cardholder 608). Further, server system 202 may increase or decrease adjustment factor 1014 based on differences in the purpose of the candidate trip and the one or more reference trips 1012 in view of the destination 906. For example, if the destination 906 caters more towards vacations than business, a cardholder may be less likely to spend more on a vacation to the destination 906 than on a business trip to the destination 906.

Figure 11:
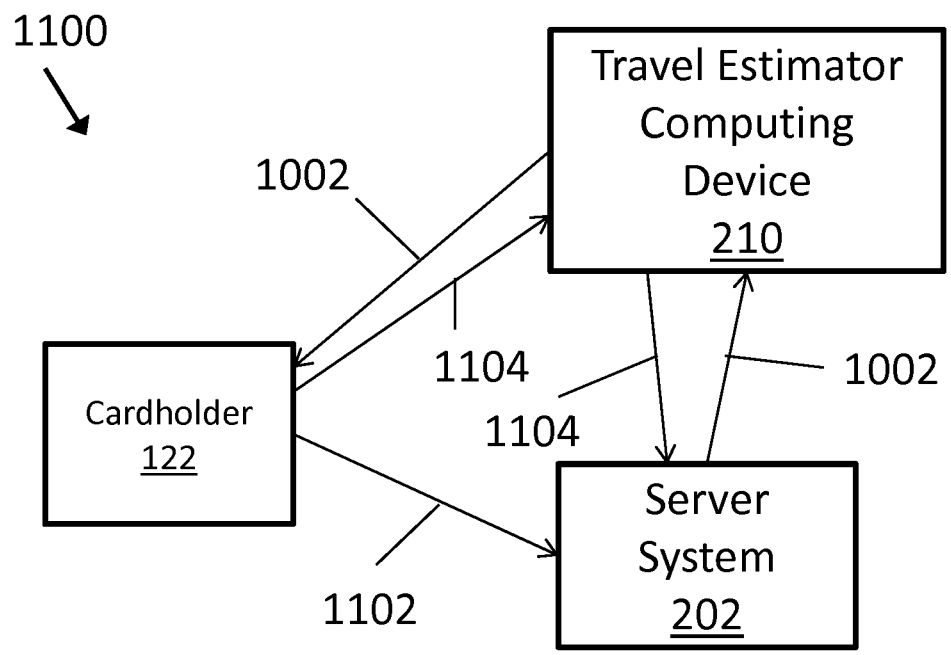

FIG. 11 is a block diagram of example communications 1100 among cardholder 122, server system 202, and travel estimator computing device 210. More specifically, prior to server system 202 generating profile 814, cardholder 122 transmits an indication of agreement 1102 for server system 202 to generate profile 814. In some implementations, cardholder 122 transmits the indication of agreement 1102 using a client computing device 204. For example, cardholder 122 may transmit the indication of agreement 1102 through a webpage (not shown) hosted, for example, by server system 202 and displayed by client computing device 204. Further, cardholder 122 transmits parameters 1104 for a candidate trip to travel estimator computing device 210, for example through a webpage (not shown) hosted by travel estimator computing device 210. More specifically, client computing device 204, associated with cardholder 122, transmits parameters 1104 to travel estimator computing device 210. Parameters 1104 include the destination 906, dates 1010, such as a beginning date and an ending date, the purpose 1006 of the trip, and an identifier of cardholder 122. Travel estimator computing device 210 transmits parameters 1104 to server system 202. Server system 202 transmits estimated price 1002 to travel estimator computing device 210, which transmits estimated price 1002 to cardholder 122. As described above, in some implementations, travel estimator computing device 210 is integrated or included within server system 202. In other implementations, travel estimator computing device 210 is associated with a third party other than a party operating server system 202. Travel estimator computing device 210 may transmit estimated price 1002 in an in a webpage displayed to cardholder 122 on client computing device 204, an email, instant message, or text message, or other electronic message. In other implementations, server computing device 202 transmits estimated price 1002 to cardholder 122 directly.

Figure 12:
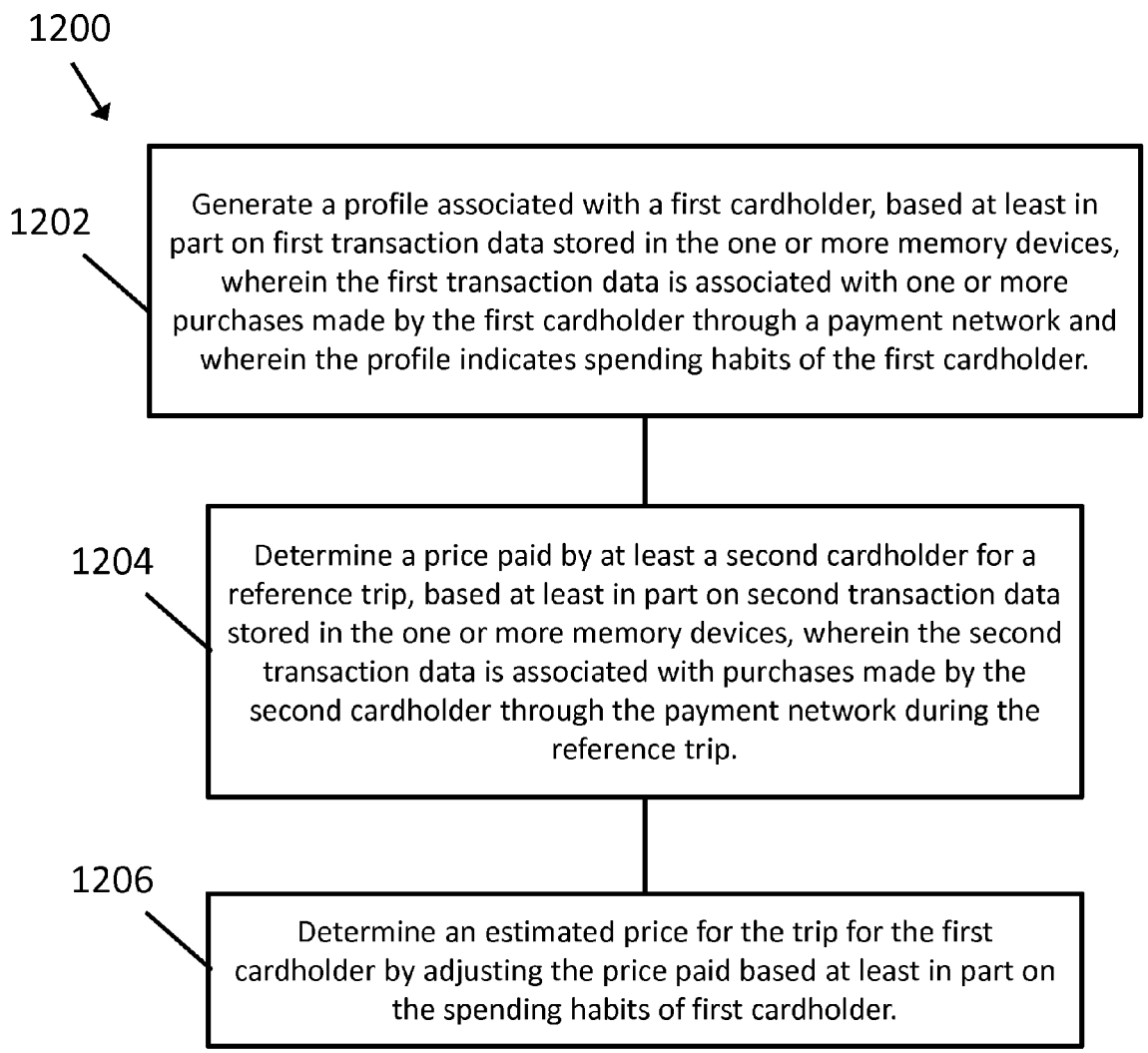
Figure 13:
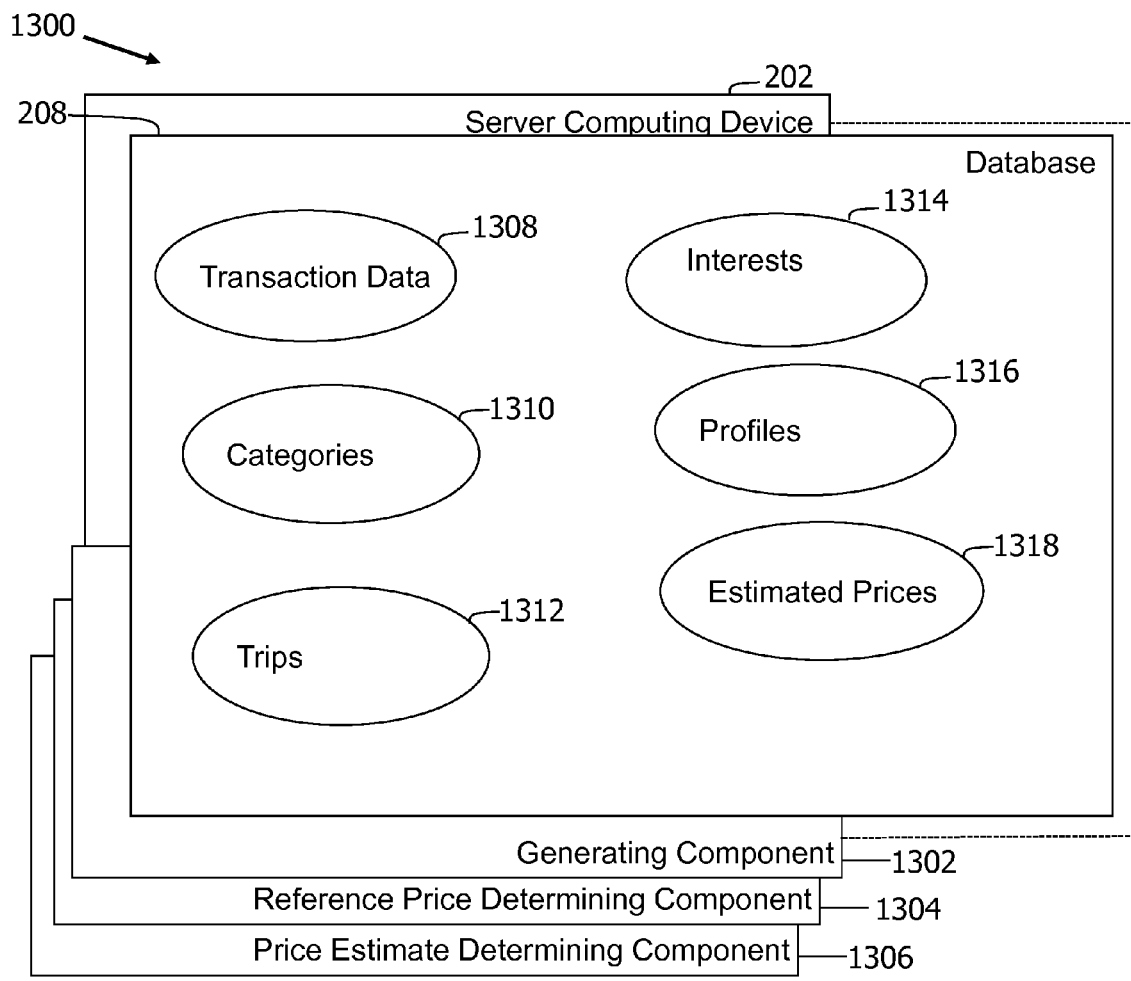

FIG. 12 is a flowchart of an example process 1200 that may be performed by estimating system 211, for example by server system 202 included within estimating system 211, for estimating a price of a candidate trip based on transaction data 1308 (FIG. 13). Server system ("server computing device") 202 generates 1202 a profile (e.g., profile 814) associated with a first cardholder (e.g., cardholder 122), based at least in part on first transaction data (e.g., transaction data 1308) stored in one or more memory devices (e.g., database 208). The first transaction data 1308 is associated with one or more purchases 802 made by the cardholder 122 through the payment network 128. Profile 814 indicates a spending trend of first cardholder 122, as described above. Additionally, server computing device 202 determines 1204 a price paid 914 by at least a second cardholder (e.g., cardholder 608) for a reference trip (e.g., reference trip 902), based at least in part on second transaction data 1308 stored in the one or more memory devices (e.g., database 208). The second transaction data 1308 is associated with purchases 912 made by the second cardholder 608 during the reference trip (e.g., reference trip 902). Additionally, server computing device 202 determines 1206 an estimated price 1002 for the candidate trip for the first cardholder 122 by adjusting the price paid (e.g., total price 914) based at least in part on the spending trend of the first cardholder 122. For example, server computing device 202 may generate and apply adjustment factor 1014, as described above.

In some implementations, server computing device 202 transmits the estimated price 1002 for the candidate trip to client computing device 204, associated with first cardholder 122. In some implementations, in generating profile 814, server computing device determines a category of goods 804 (FIG. 8) purchased by the first cardholder 122 and determines an average amount paid by the cardholder for the goods, for example based on transaction amounts 808 (FIG. 8). In some implementations, server computing device 202 additionally receives trip parameters 1104 including an indication of the purpose 1006 of the candidate trip, the duration of the candidate trip (e.g., dates 1010), and a location (e.g., destination 906) associated with the candidate trip and determines the estimated price 1002 based additionally on the trip parameters 1104. In some implementations, in generating the profile 814, server computing device 202 determines a life stage (e.g., first life stage 701) of the first cardholder 122 based at least in part on the first transaction data 1308 (e.g., purchases 802). In some implementations, server computing device 202 selects the second cardholder (e.g., cardholder 608) based on the life stage 701 of the first cardholder 122. For example, server computing device 202 determines that first life stage 701 is associated with first cardholder 122 and second card holder 608, and selects second cardholder 608 at least in part because of the shared life stage 701 with first cardholder 122.

In some implementations, server computing device 202 determines a life stage associated with a second cardholder 616 (e.g., second life stage 703) who took a similar trip to the candidate trip planned by the first cardholder 122, determines a difference between the first life stage 701, associated with first cardholder 122, and the second life stage 703 associated with second cardholder 616, and determines the estimated price 1002 based additionally on the difference in the life stages 701 and 703. More specifically, server computing device 202 increases or decreases adjustment factor 1014 based at least in part on the difference in the life stages 701 and 703. In some implementations, server computing device 202 receives, from the client computing device 204 associated with first cardholder 122, an indication of a time of year for the candidate trip, for example dates 1010, and determines the estimated price 1002 based additionally on the indication of the time of year for the candidate trip. In some implementations, server computing device 202 determines a rate of inflation and determines the estimated price 1002 based additionally on the rate of inflation, as described above. In some implementations, server computing device 202 receives an indication 1102 from the first cardholder 122 that the first cardholder 122 agrees to generation of the profile 814.

In some implementations, server computing device 202 determines dates associated with the reference trip 902 based on locations associated with purchases made by the second cardholder in the second transaction data. For example, server computing device 202 determines that from a beginning date to an ending date, the second cardholder purchased items in a different geographic area (e.g., Las Vegas) than where the second cardholder normally makes purchases (e.g., St. Louis). Accordingly, server computing device determines that the beginning date and the ending date are associated with the beginning and ending of reference trip 902. In some implementations, server computing device 202 determining dates associated with the reference trip 902 based on when transactions for travel tickets cleared in the second transaction data. More specifically, in such implementations, a purchase of, for example, a plane ticket for a flight to the destination clears when the flight to the destination occurs. Likewise, a purchase of a plane ticket for a flight from the destination clears when the flight from the destination occurs. Accordingly, server computing device 202 determines the beginning date to be the date that the purchase of the ticket for the flight to the destination cleared and the ending date to be the date that the purchase of the ticket for the flight from the destination cleared.

FIG. 13 is a diagram 1300 of components of one or more example computing devices, for example, server computing device 202 that may be used in embodiments of the described systems and methods. FIG. 13 further shows a configuration of database 208 (FIG. 2). Database 208 is communicatively coupled to server computing device 202.

Server computing device 202 includes a generating component 1302 for generating a profile 814 associated with a cardholder (e.g., cardholder 122), based at least in part on first transaction data 1308 stored in the one or more memory devices (e.g., database 208). The first transaction data 1308 is associated with one or more purchases 802 made by cardholder 122 through payment network 128. Profile 814 indicates a spending trend of cardholder 122. Server computing device 202 additionally includes a reference price determining component 1304 for determining a price paid by at least a second cardholder (e.g., cardholder 608) for a reference trip, based at least in part on second transaction data 1308 stored in the one or more memory devices (e.g., database 208). The second transaction data 1308 is associated with purchases 912 made by the second cardholder 608 through the payment network 128 during the reference trip. Additionally, server computing device 202 includes a price estimate determining component 1306 for determining an estimated price 1002 for the candidate trip for the first cardholder 122 by adjusting the price paid 914 for the reference trip 902 at least in part on the spending trend of the first cardholder 122.

In an example embodiment, database 208 is divided into a plurality of sections, including but not limited to, a transaction data section 1308, a categories section 1310, a trips section 1312, an interests section 1314, a profiles section 1316, and an estimated prices section 1318. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The embodiments of the method and system described above generate an estimate for the price of a candidate trip planned by a cardholder based on stored transaction data associated with multiple cardholders. The system generates the estimate by generating a profile of the cardholder planning the candidate trip, based on the stored transaction data, referencing prices of similar trips taken by other cardholders in the past, and adjusting the estimated price based on the spending trend of the cardholder planning the candidate trip. Accordingly, the system provides a more complete and tailored price estimate for a candidate trip, as compared to known systems.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for estimating a price of a candidate trip based on transaction data, said method implemented using an estimating computing device in communication with one or more memory devices, said method comprising:
   generating a profile associated with a first cardholder, based at least in part on first transaction data stored in the one or more memory devices, wherein the first transaction data is associated with one or more purchases made by the first cardholder through a payment network and wherein the profile indicates a spending trend of the first cardholder;
   determining a price paid by at least one second cardholder for a reference trip, based at least in part on second transaction data stored in the one or more memory devices, wherein the second transaction data is associated with purchases made by the at least one second cardholder through the payment network during the reference trip;
   determining an estimated price for the candidate trip for the first cardholder by adjusting the price paid by the at least one second cardholder for the reference trip based at least in part on the spending trend of the first cardholder; and
   transmitting the estimated price for the candidate trip to at least a client computing device associated with the first cardholder.

2. The method of claim 1, wherein generating the profile further comprises:
   determining a category of goods purchased by the first cardholder; and
   determining an average amount paid by the first cardholder for the goods.

3. The method of claim 1, further comprising:
   receiving, from the client computing device, trip parameters including an indication of a purpose of the candidate trip, a duration of the candidate trip, and a location associated with the candidate trip; and
   determining the estimated price based additionally on the trip parameters.

4. The method of claim 1, further comprising averaging prices paid for a plurality of reference trips.

5. The method of claim 1, further comprising applying an adjustment factor to the estimated price to account for a difference in a first purpose of the candidate trip and a second purpose of the reference trip.

6. The method of claim 1, further comprising applying an adjustment factor to the estimated price to account for a difference in a first set of dates for the candidate trip and a second set of dates of the reference trip.

7. The method of claim 1, further comprising:
receiving, from the client computing device, an indication of a time of year for the candidate trip; and
determining the estimated price based additionally on the indication of the time of year for the candidate trip.

8. The method of claim 1, further comprising determining dates associated with the reference trip based on locations associated with purchases made by the at least one second cardholder in the second transaction data.

9. The method of claim 1, further comprising determining dates associated with the reference trip based on when transactions for travel tickets cleared in the second transaction data.

10. The method of claim 1 further comprising determining a life stage of the first cardholder based at least in part on the first transaction data stored in memory; and selecting the second cardholder based on the life stage assigned to the first cardholder.

11. An estimating computing device for estimating a price of a candidate trip based on transaction data, said computing device comprising one or more processors in communication with one or more memory devices, said estimating computing device configured to:
generate a profile associated with a first cardholder, based at least in part on first transaction data stored in the one or more memory devices, wherein the first transaction data is associated with one or more purchases made by the first cardholder through a payment network and wherein the profile indicates a spending trend of the first cardholder;
determine a price paid by at least one second cardholder for a reference trip, based at least in part on second transaction data stored in the one or more memory devices, wherein the second transaction data is associated with purchases made by the at least one second cardholder through the payment network during the reference trip;
determine an estimated price for the candidate trip for the first cardholder by adjusting the price paid by the at least one second cardholder for the reference trip based at least in part on the spending trend of the first cardholder; and
transmit the estimated price for the candidate trip to at least a client computing device associated with the first cardholder.

12. The estimating computing device of claim 11, further configured such that generating the profile further comprises:
determining a category of goods purchased by the first cardholder; and
determining an average amount paid by the first cardholder for the goods.

13. The estimating computing device of claim 11, further configured to:
receive, from the client computing device, trip parameters including an indication of a purpose of the candidate trip, a duration of the candidate trip, and a location associated with the candidate trip; and
determine the estimated price based additionally on the trip parameters.

14. The estimating computing device of claim 11, further configured such that generating the profile further comprises determining a life stage of the first cardholder based at least in part on the first transaction data.

15. The estimating computing device of claim 14, further configured to select the at least one second cardholder based on the life stage of the first cardholder.

16. The estimating computing device of claim 14, wherein the life stage is a first life stage and said estimating computing device is further configured to:
determine a second life stage associated with the at least one second cardholder;
determine a difference between the first life stage and the second life stage; and
determine the estimated price based additionally on the determined difference between the first life stage and the second life stage.

17. The estimating computing device of claim 11, further configured to:
receive, from the client computing device, an indication of a time of year for the candidate trip; and
determine the estimated price based additionally on the indication of the time of year for the candidate trip.

18. The estimating computing device of claim 11, further configured to:
determine a rate of inflation; and
determine the estimated price based additionally on the rate of inflation.

19. A computer-readable storage medium having computer-executable instructions embodied thereon for estimating a price of a candidate trip based on transaction data, wherein when executed by an estimating computing device having one or more processors in communication with one or more memory devices, the computer-executable instructions cause the estimating computing device to:
generate a profile associated with a first cardholder, based at least in part on first transaction data stored in the one or more memory devices, wherein the first transaction data is associated with one or more purchases made by the first cardholder through a payment network and wherein the profile indicates a spending trend of the first cardholder;
determine a price paid by at least one second cardholder for a reference trip, based at least in part on second transaction data stored in the one or more memory devices, wherein the second transaction data is associated with purchases made by the at least one second cardholder through the payment network during the reference trip;
determine an estimated price for the candidate trip for the first cardholder by adjusting the price paid by the at least one second cardholder for the reference trip based at least in part on the spending trend of the first cardholder; and
transmit the estimated price for the candidate trip to at least a client computing device associated with the first cardholder.

* * * * *